United States Patent
Paing et al.

(10) Patent No.: US 8,282,141 B2
(45) Date of Patent: Oct. 9, 2012

(54) LATCH ASSEMBLY FOR VEHICLE SEAT

(75) Inventors: Hyun Sung Paing, Incheon (KR); Jun Kyu Park, Incheon (KR)

(73) Assignee: Austem Co., Ltd., Cheonan-si (KR)

( * ) Notice: Subject to any disclaimer, the term of this patent is extended or adjusted under 35 U.S.C. 154(b) by 253 days.

(21) Appl. No.: 12/595,324

(22) PCT Filed: Apr. 22, 2008

(86) PCT No.: PCT/KR2008/002265
§ 371 (c)(1),
(2), (4) Date: Oct. 9, 2009

(87) PCT Pub. No.: WO2009/069863
PCT Pub. Date: Jun. 4, 2009

(65) Prior Publication Data
US 2011/0175388 A1  Jul. 21, 2011

(30) Foreign Application Priority Data

Nov. 27, 2007 (KR) .................. 10-2007-0121538
Apr. 15, 2008 (KR) .................. 10-2008-0034477

(51) Int. Cl.
*E05C 3/06* (2006.01)
*B60N 2/00* (2006.01)
(52) U.S. Cl. ........................ 292/216; 297/336
(58) Field of Classification Search ............... 292/216; 297/336
See application file for complete search history.

(56) References Cited

U.S. PATENT DOCUMENTS

| 5,730,480 | A | * | 3/1998 | Takamura | 248/503.1 |
| 7,044,552 | B2 | | 5/2006 | Muller et al. | |
| 7,243,974 | B2 | * | 7/2007 | Kondo et al. | 296/65.03 |
| 7,431,371 | B2 | * | 10/2008 | Miller et al. | 296/65.03 |
| 7,475,922 | B2 | * | 1/2009 | Ottino et al. | 292/216 |
| 7,575,280 | B2 | * | 8/2009 | Palomba et al. | 297/336 |
| 7,762,605 | B2 | * | 7/2010 | Otsuka et al. | 296/65.03 |
| 7,926,858 | B2 | * | 4/2011 | Otsuka | 292/216 |
| 8,029,030 | B2 | * | 10/2011 | Shimura et al. | 292/216 |
| 2005/0104384 | A1 | * | 5/2005 | Kondo et al. | 292/240 |
| 2005/0212338 | A1 | * | 9/2005 | Muller et al. | 297/336 |
| 2010/0032967 | A1 | * | 2/2010 | Otsuka | 292/240 |

FOREIGN PATENT DOCUMENTS

| JP | 2000001135 A | 1/2000 |
| KR | 10-0450297 B1 | 10/2003 |

* cited by examiner

*Primary Examiner* — Carlos Lugo
(74) *Attorney, Agent, or Firm* — Schmeiser, Olsen & Watts LLP

(57) ABSTRACT

A latch assembly for a vehicle seat is provided which includes a base plate, a latch coupled to the base plate to rotate between locking position and open position, and a pawl and a pawl plate being coaxial on the base plate and coupled to overlap and interact therebetween, wherein the latch includes a locking surface, the pawl plate includes a pressing surface pressing the locking surface when the latch is at the locking position and a first supporting surface supporting the locking surface when the latch receives impact, and the pawl includes a second supporting surface supporting the locking surface together with the pawl plate when the latch receives the impact. Thus, the latch assembly has an improved configuration enabling a convenient handling and smoothly operating although there is a coupling condition error, and stably maintaining a coupling state in spite of external impact.

19 Claims, 6 Drawing Sheets

LATCH ASSEMBLY FOR VEHICLE SEAT

TECHNICAL FIELD

The present invention relates to a latch assembly for a vehicle seat, and more particularly, to a latch assembly mounted to a vehicle seat to assemble and disassemble the vehicle seat to a chassis.

BACKGROUND ART

A latch assembly for a vehicle seat is an apparatus for assembling and disassembling a vehicle seat to a chassis.

It is necessary that the latch assembly for the vehicle seat has convenience of an operation, and a smooth working under various coupling conditions. Especially, although an impact is applied to a chassis when the seat is coupled to the chassis, it is necessary that a coupling state thereof is certainly maintained.

To satisfy the above requirement, a lot of technologies have been developed, and a latch assembly for a vehicle seat having a base plate, a latch rotatably coupled to the base plate and a pawl interacting with the latch has been disclosed and released.

However, there is still a demand for an improved latch assembly for a vehicle seat.

DISCLOSURE OF INVENTION

Technical Problem

It is an aspect of the present invention to provide a latch assembly for a vehicle seat having an improved configuration which enables a convenient handling and is capable of smoothly operating although there is a coupling condition error, and stably maintaining a coupling state in spite of an external impact against a chassis.

Technical Solution

The foregoing and/or other aspects of the present invention can be achieved by providing a latch assembly for a vehicle seat which comprises a base plate, a latch which is rotatably coupled to the base plate to rotate between a locking position and an open position, and a pawl and a pawl plate which are coaxial with the base plate and coupled to be overlapped each other to interact with each other to rotate, the latch assembly for the vehicle seat comprising: the latch comprising a locking surface; the pawl plate comprising a pressing surface which presses the locking surface when the latch is positioned at the locking position, and a first supporting surface which supports the locking surface when the latch rotates by means of an impact; and the pawl comprising a second supporting surface which supports the locking surface together with the pawl plate when the latch rotates by means of the impact.

According to an aspect of the present invention, the pressing surface forms a part of a circular arc which comprises a rotation center which is distanced from a rotation shaft of the pawl plate to contact to the locking surface to form a predetermined pressing angle when the latch is positioned at the locking position, and the first supporting surface extends from a first side of the pressing surface, and forms a part of a circular arc, the center of which is the rotation shaft of the pawl plate.

According to an aspect of the present invention, the pawl plate further comprises an engagement end unit which protrudes from a second side of the pressing surface in a radius direction to prevent the pawl plate from additionally rotating when the latch is positioned at the locking position.

According to an aspect of the present invention, the latch comprises a lower latch which interacts with the pawl, and an upper latch which is integrally overlapped over the lower latch to interact with the pawl plate, the locking surface comprises a lower locking surface which is formed to the lower latch, and an upper locking surface which is formed to the upper latch, and the first supporting surface supports the upper locking surface, and the second supporting surface supports the lower locking surface when the latch rotates by means of the impact.

According to an aspect of the present invention, the lower locking surface and the upper locking surface are formed to correspond to each other.

According to an aspect of the present invention, the upper latch is formed with an accommodating space unit which accommodates an end part of the second supporting surface of the pawl plate when the latch is positioned at the locking position.

According to an aspect of the present invention, the latch comprises a blocking surface, and the first supporting surface and the second supporting surface support the blocking surface when the latch is positioned at the open position.

According to an aspect of the present invention, the latch comprises a lower latch which interacts with the pawl, and an upper latch which is integrally overlapped over the lower latch to interact with the pawl plate, the blocking surface comprises a lower blocking surface which is formed to the lower latch, and an upper blocking surface which is formed to the upper latch, and the first supporting surface supports the upper blocking surface, and the second supporting surface supports the lower blocking surface when the latch is positioned at the open position.

According to an aspect of the present invention, the latch is formed with a pressing end unit which presses an end part of the firs supporting surface to rotate the pawl plate by a predetermined angle while rotating from the open position to the locking position.

According to an aspect of the present invention, the pawl plate is restricted by means of the pawl to have a restricted rotation range.

According to an aspect of the present invention, the pawl comprises a guide protrusion which is distanced from a rotation shaft thereof to protrude, and the pawl plate comprises a slide groove which accommodates the guide protrusion, and guides the guide protrusion to rotate in a circumferential direction by a predetermined interval.

According to an aspect of the present invention, the pawl and the pawl plate are elastically pressed to respectively and independently rotate toward the latch.

According to an aspect of the present invention, the base plate comprises a depressed groove unit which has a wide width, and accommodates a locking pin which is coupled to a chassis, the latch comprises a latch groove unit which accommodates the locking pin together with the depressed groove unit, and the locking position of the latch varies depending on the thickness of the locking pin or a position in which the locking pin is accommodated inside the depressed groove unit.

Advantageous Effects

According to the latch assembly for the vehicle seat according to the present invention, the latch assembly can be smoothly locked and released to and from the locking pin provided to the chassis through the interaction between the latch, the pawl and the pawl plate, and especially, the pawl and pawl plate support the latch together to certainly maintain the locking state of the latch assembly when an impact is applied to the latch at the locking position.

Also, according to the latch assembly for the vehicle seat according to the present invention, the pressing surface of the pawl plate forms a circular arc having a rotation center distanced from the rotation shaft of the pawl plate to form a pressing angle in contacting to the locking surface, thereby appropriately coping with a small impulse transmitted from the latch without rotation of the pawl plate.

Also, according to the latch assembly for the vehicle seat according to the present invention, the latch is divided into the lower latch and the upper latch, thereby being freely designed with respect to the shape of corresponding surfaces respectively interacting with the pawl and the pawl plate without being restricted to each other.

Also, the pawl plate has a relatively restricted rotation range with respect to the pawl so that the latch can be guided to be always simultaneously supported by means of the pawl and the pawl plate when the latch receives an impact at the locking position, or is positioned at the open position, thereby improving an operation stability of the latch assembly.

Also, the base plate forms the depressed groove unit having such a sufficient width as to accommodate the locking pin of a side of the chassis so that the locking position of the latch can be variously determined depending on the position at which the latch groove unit contacts to and supports the locking pin although there is an error in the thickness of the locking pin or the position in which the locking pin is accommodated to the depressed groove unit, thereby preventing movement and noises by means of the locking pin when the chassis is vibrated.

BEST MODE FOR CARRYING OUT THE INVENTION

Figure 1:
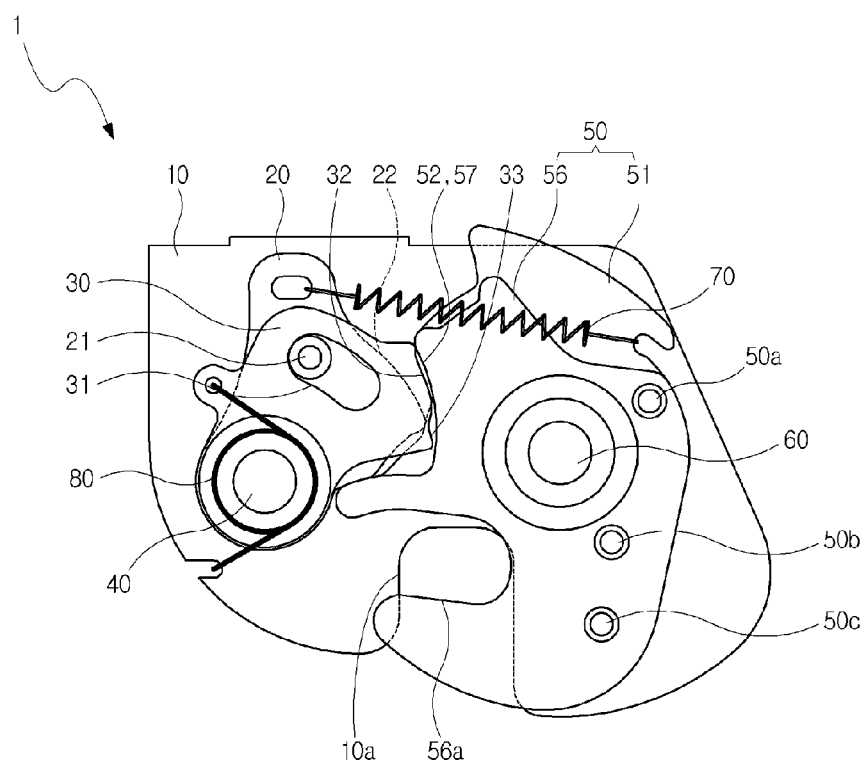
FIG. 1 is a front view illustrating an inner state of a latch assembly for a vehicle seat according to an exemplary embodiment of the present invention.

As shown in FIG. 1, a latch assembly for a vehicle seat 1 according to an exemplary embodiment of the present invention includes a base plate 10, a pawl 20, a pawl plate 30 and a latch 50.

The pawl 20 and the pawl plate 30 are rotatably coupled to the base plate 20 by means of a shaft 40. Especially, the pawl 20 and the pawl plate 30 are overlapped each other so that the pawl 20 can be positioned to a lower part thereof and the pawl plate 30 can be positioned to an upper part thereof, and coaxially rotate about the shaft 40.

Also, the pawl 20 and the pawl plate 30 are respectively formed with a guide protrusion 21 and a slide groove 31.

The guide protrusion 21 is distanced from the shaft in a radius direction by a predetermined distance to protrude, and the slide groove 31 is formed through the pawl plate 30 to correspond to the guide protrusion 21. The guide protrusion 21 is inserted to the slide groove 31 to rotate in a circumferential direction along the slide groove 31.

Accordingly, the pawl 20 and the pawl plate 30 are capable of rotating within a relatively restricted range by means of a coupling of the guide protrusion 21 and the slide groove 31.

The latch 50 is rotatably coupled to a shaft 60 coupled to a position distanced rightward from the shaft 40 of the pawl 20 and the pawl plate 30 on the base plate 10.

Especially, the latch 50 includes a lower latch 51 and an upper latch 56 overlapped up and down each other, and integrally coupled by means of pins 50a, 50b and 50c.

When the latch 50 rotates, the lower latch 51 interacts with the pawl 20, and the upper latch 56 interacts with the pawl plate 30.

The pawl 20 and the pawl plate 30 are provided to be elastically and independently pressed toward the latch 50. The pawl 20 is pressed in an attracting direction toward the latch 50 by means of a tension spring 70, and the pawl plate 30 is supported to the base plate 10 and is pressed to rotate in a clockwise direction by means of a torsion spring 80.

The pawl plate 30 includes a pressing surface 32 formed to an external circumference thereof contacting to a locking surface 57 of the latch 50 to support the locking surface 57 in locking.

Figure 2:
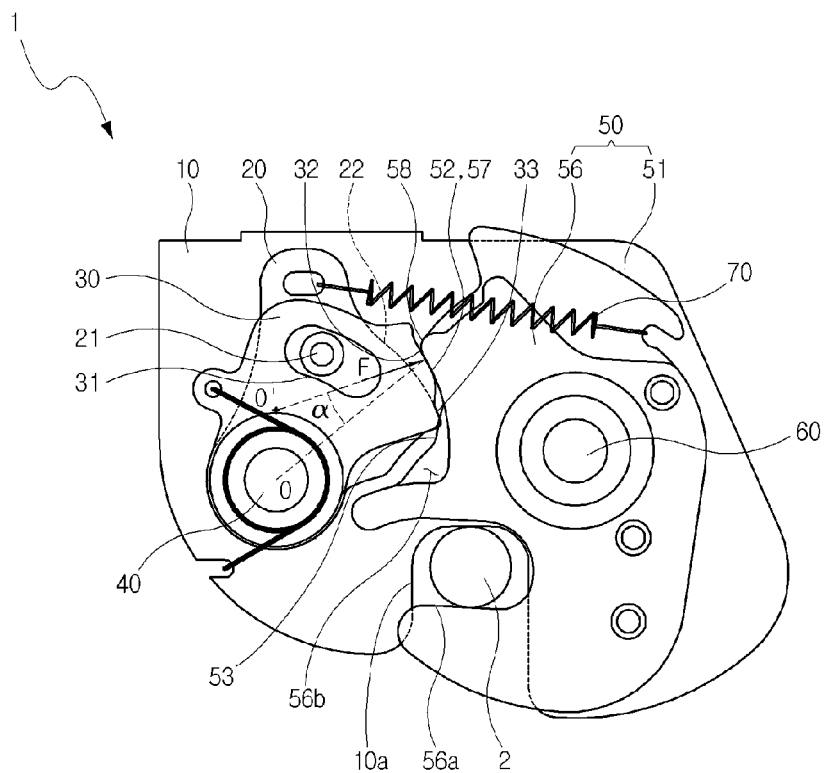
FIG. 2 is a front view illustrating a locking state of the latch assembly for the vehicle seat in FIG. 1.

FIG. 2 illustrates the latch assembly for the vehicle seat 1 in a locking state. The locking state represents a state in which a locking pin 2 provided to a chassis of a vehicle is accommodated to a depressed groove part 10a of the base plate 10 and a latch groove part 56a of the latch 50 to be restricted. More in detail, in that state, an upper end of the locking pin 2 is supported to the depressed groove part 10a, and a lower end thereof is supported to the latch groove part 56a.

Like this, when the locking pin 2 is accommodated to the depressed groove part 10a to be locked by means of the latch groove part 56a, the pressing surface 32 of the pawl plate 30 supports the latch 50, more in detail, an upper locking surface 57 of the upper latch 56.

Here, locking surfaces 52 and 57 of the latch 50 include a lower locking surface 52 of a side of the lower latch 51, and the upper locking surface 57 of a side of the upper latch 56.

The locking surfaces 52 and 57 are formed to correspond to each other, and the lower locking surface 52 interacts with a second supporting surface 22 of the pawl 20 if an impact is applied to the latch 50.

The pressing surface 32 of the pawl plate 30 forms a circular arc, and is formed so that a center O thereof is positioned at a position distanced upward from a center O of the shaft 40.

Accordingly, a perpendicular line at a contact point between the pressing surface 32 and the upper locking surface 57 passes through the center O of the pressing surface 32, and a supporting force F of the pressing surface 32 supporting the locking surface 57 exists on this perpendicular line.

That is, a direction of the supporting force F has a predetermined pressing angle α against the center O of the shaft 40. By means of the pressing angle α although a predetermined impact is transmitted from the locking surface 57, the pressing surface 32 can be prevented from immediately rotating in a counterclockwise direction, and absorb the impact to some degree through the shaft 40.

Here, as the pressing angle α increases, the magnitude of the supporting force F of the pressing surface 32 decreases.

On the other hand, as the pressing angle α decreases, the magnitude of the supporting force F increases.

The value of the pressing angle α may be appropriately determined as to prevent a plastic deformation of the pawl plate 30. If a relatively big impact is applied from the locking surface 57, the pawl plate 30 rotates in the counterclockwise direction to some extent so that a first supporting surface 33 of the pawl plate 30 and the second supporting surface 22 of the pawl 20 can support the locking surfaces 52 and 57 together (referring to FIG. 12).

As shown in FIG. 2, in the locking state in which the pressing surface 32 contacts to and supports the upper locking surface 57, an end part of the second supporting surface 22 of the pawl 20 contacts and is supported to a round surface 53 of the lower latch 51, and an end part of the first supporting surface 33 of the pawl plate 30 is partially accommodated to an accommodating space unit 56b which is recessed from the upper latch 56 to correspond thereto.

That is, the lower latch 51 and the upper latch 56 may be formed to have various shapes of interactive surfaces thereof as necessary so that an interactive operation between the pawl 20 and the pawl plate 30 can be certainly maintained, and a degree of freedom in respective shape designs can be sufficiently obtained guaranteed.

A rotation center of the round surface 53 having the circular arc shape corresponds to the center of the shaft 60 to minimize a contact friction against the end part of the second supporting surface 22, thereby enabling the latch 50 to smoothly rotate.

FIGS. 3 to 8 illustrate a locking withdrawing process of the latch assembly for vehicle seat 1 from the locking state in FIG. 2 in sequence.

Figure 3:
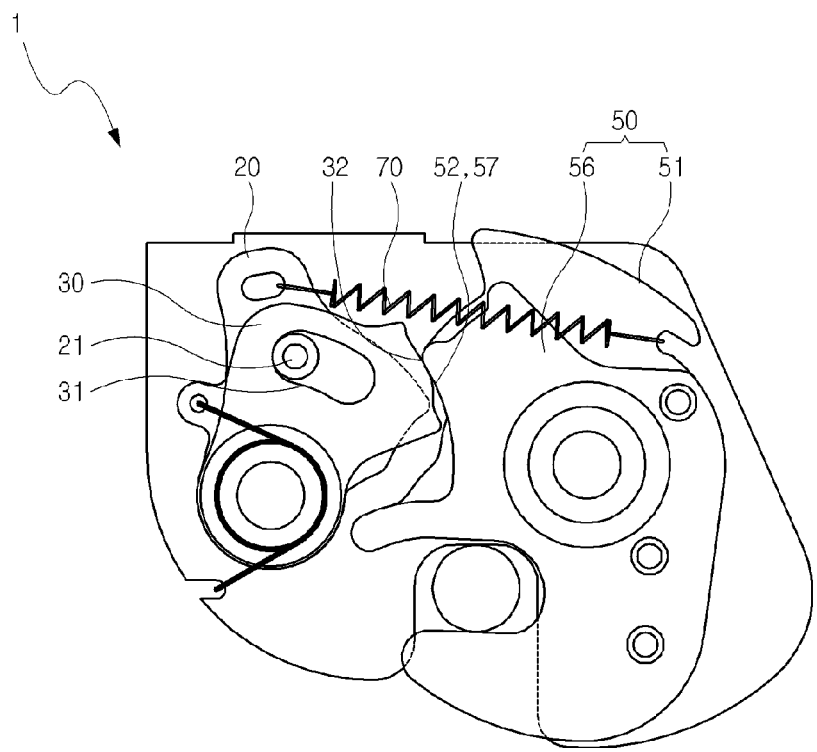
FIGS. 3 to 8 are front views respectively illustrating a locking withdrawing process of the latch assembly for the vehicle assembly in the locking state in FIG. 2 in sequence.

In general, if a lever (not shown) coupled to the pawl 20 is rotated, as shown in FIG. 3, the pawl 20 rotates in the counterclockwise direction together so that the guide protrusion 21 can contact to an end part of the slide groove 31 of the pawl plate 30, and then, the pawl 20 and the pawl plate 30 rotate in the counterclockwise direction together.

The rotation in the counterclockwise direction of the pawl 20 is transmitted to the latch 50 through the tension spring 70 so that the upper locking surface 57 of the latch 50 can maintain a contact state against the pressing surface 32 of the pawl plate 30.

Figure 4:
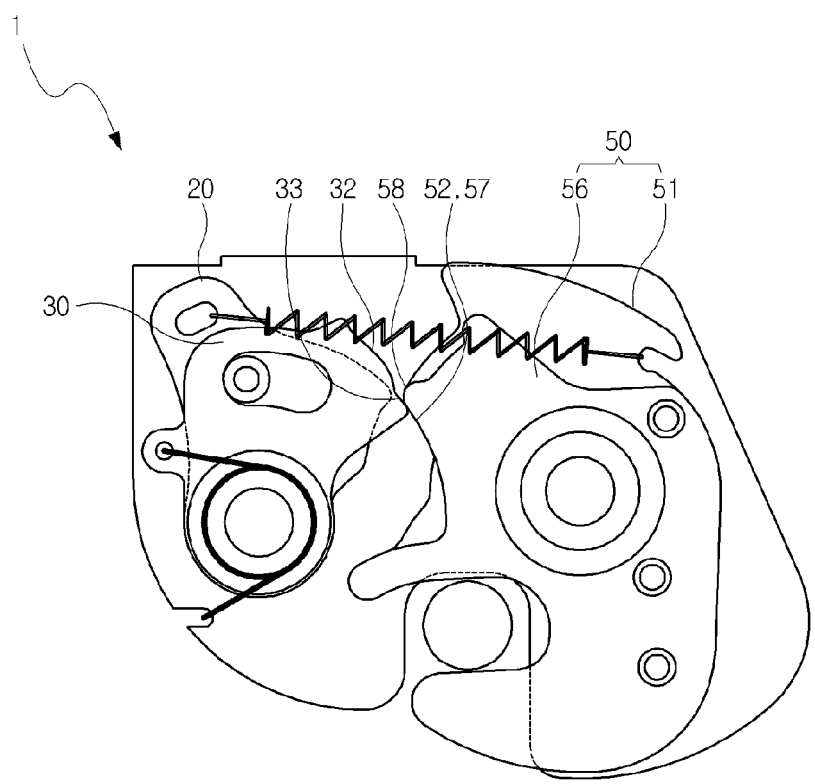
Figure 5:
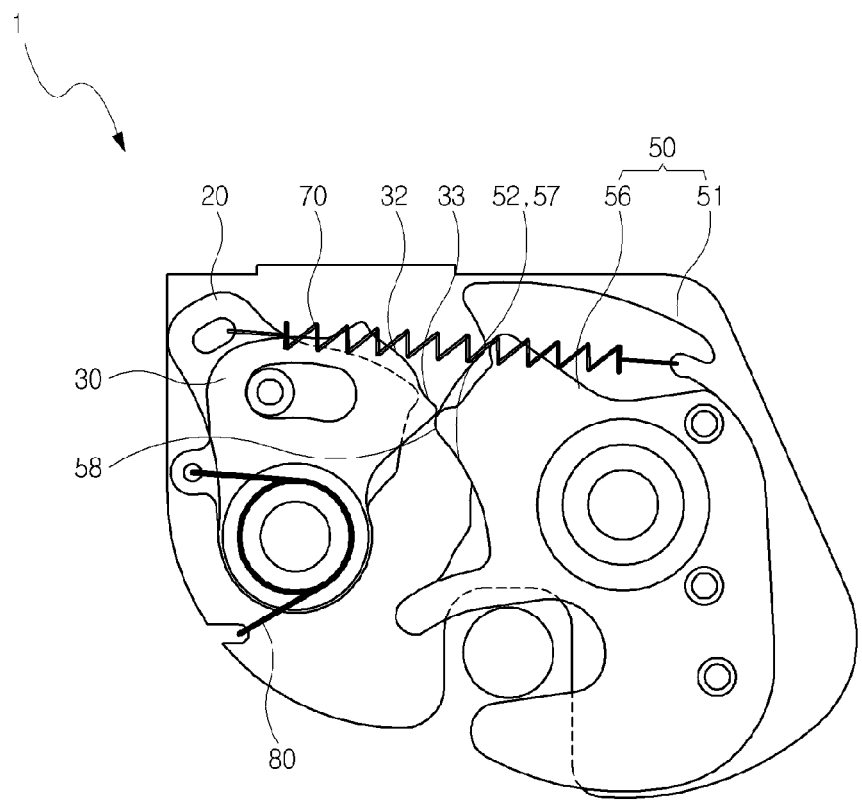

As shown in FIGS. 4 and 5, if the pawl 20 and the pawl plate 30 additionally rotate in the counterclockwise direction, the first supporting surface 33 extending to be adjacent to the pressing surface 32 can contact to the upper locking surface 57 and a pressing end part 58 adjacent thereto in sequence.

If the first supporting surface 33 passes through the pressing end part 58 of the latch 50, the pawl 20, the pawl plate 30 and the latch 50 automatically interact one after another by means of the springs 70 and 80 although an external force through the lever is removed. That is, a contraction force is generated in the tension spring by means of an extension, and a restitution force in the counterclockwise direction is generated in the torsion spring 40 by means of a rotation compression.

Figure 6:
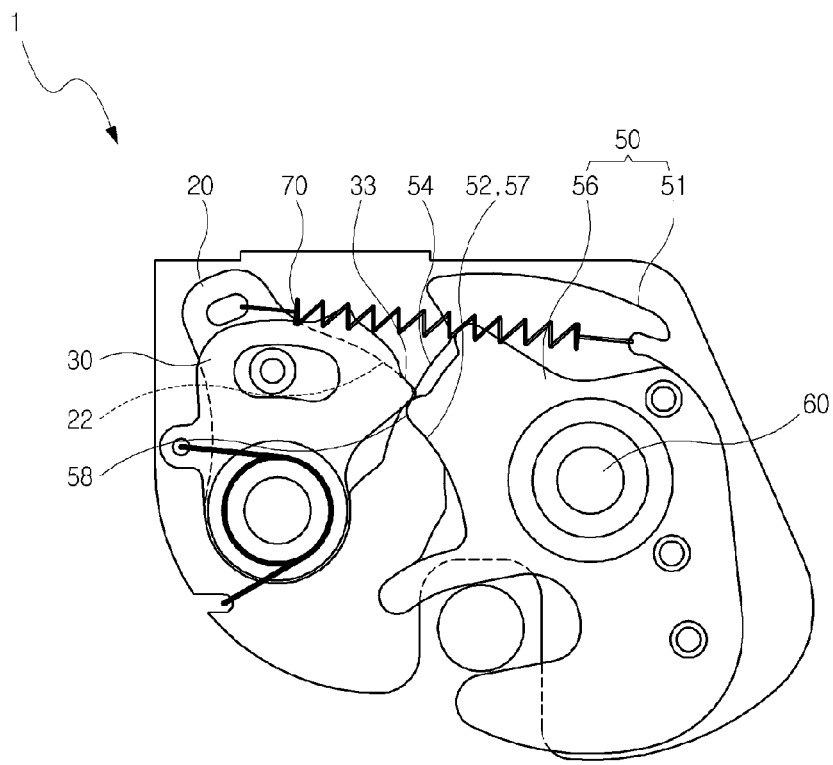

If the external force of the lever is removed in FIG. 5, at first, the pawl 20 rotates in the clockwise direction to some extent by means of an attraction force of the tension spring 70 so that the end part of the second supporting surface 22 can contact and be supported to the round surface 54 of the lower latch 51 as shown in FIG. 6. Meanwhile, the end part of the first supporting surface 33 of the pawl plate 30 passes through the pressing end part 58 of the upper plate 56.

The round surface 54 forms a part of a circular arc centering the shaft 60 to minimize instability of a rotation operation of the latch 50 due to a contact friction.

Figure 7:
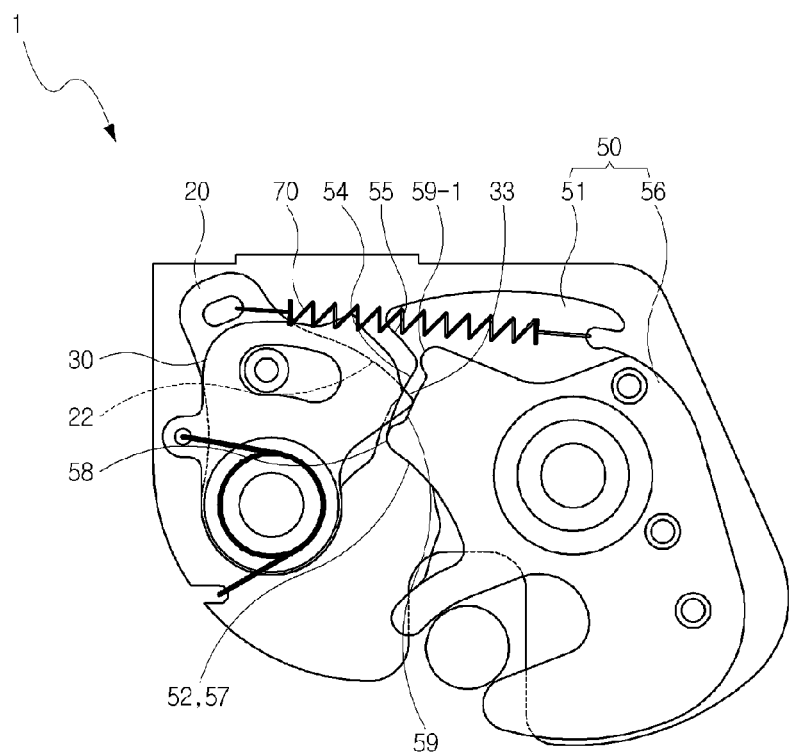

Then, as shown in FIG. 7, the end part of the first supporting surface 33 of the pawl plate 30 passes by the pressing end part 58 to slide with contacting against the round surface 59. At the same time, the end part of the second supporting surface 22 of the pawl 20 slides with contacting against the round surface 54 of a side of the lower latch 51.

Then, as shown in FIGS. 6 and 7, the latch 50 rotates in the counterclockwise direction by means of the attraction force of the tension spring 70.

Also, the pawl 20 and the pawl plate 30 are prevented from additionally rotating in the clockwise direction by means of the end part of the second supporting surface 22 and the end part of the first supporting surface 33 contacting and sliding on the two round surfaces 54 and 59 of the latch 50, and the rotation angle thereof is maintained like that.

Figure 8:
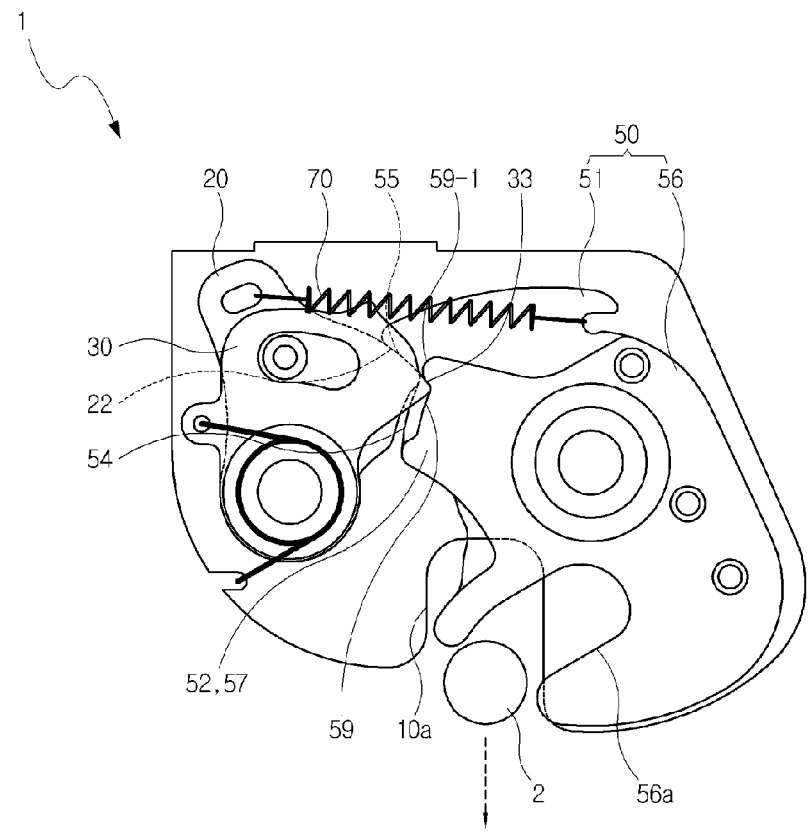

Then, as shown in FIG. 8, the latch 50 additionally rotates in the counterclockwise direction so that a lower blocking surface 55 of the lower latch 51 can contact and be supported to the second supporting surface 22 of the pawl 20 to complete the rotating.

At the same time, an upper blocking surface 59-1 of the upper latch 56 contacts and is supported to the first supporting surface 33 of the pawl plate 30.

Accordingly, the locking pin 2 is capable of being separated from the depressed groove part 10a and the latch groove part 56a.

In practice, since the base plate 10 is coupled to a lower end part of the seat, and the locking pin 2 is coupled to a bottom of the chassis, FIGS. 3 to 8 after operating the above lever of the seat and operating the pawl 20 represent that the position of the locking pin 2 is stationary, and the seat, that is, the latch assembly 1 is lifted upward on the contrary.

In FIG. 8, the lower blocking surface 55 and the upper blocking surface 59-1 are respectively contacted and supported to the second supporting surface 22 of the pawl 20 and the first supporting surface 33 of the pawl plate 30 so that the latch 50 can constantly maintain an open state having a predetermined rotation angle.

Hereinafter, a process of the latch assembly for the vehicle seat 1 from the locking withdrawn state in FIG. 8 to the locking state will be described.

At first, in the open state in FIG. 8, the seat is put down so that the locking pin 2 of the bottom can be inserted to the depressed groove part 10a of the base plate 10. That is, in the figure, if the locking pin 2 is inserted to the depressed groove part 10a, the latch groove part 56a is pressed by means of the locking pin 2 so that the latch 50 can rotate in the clockwise direction.

Figure 9:
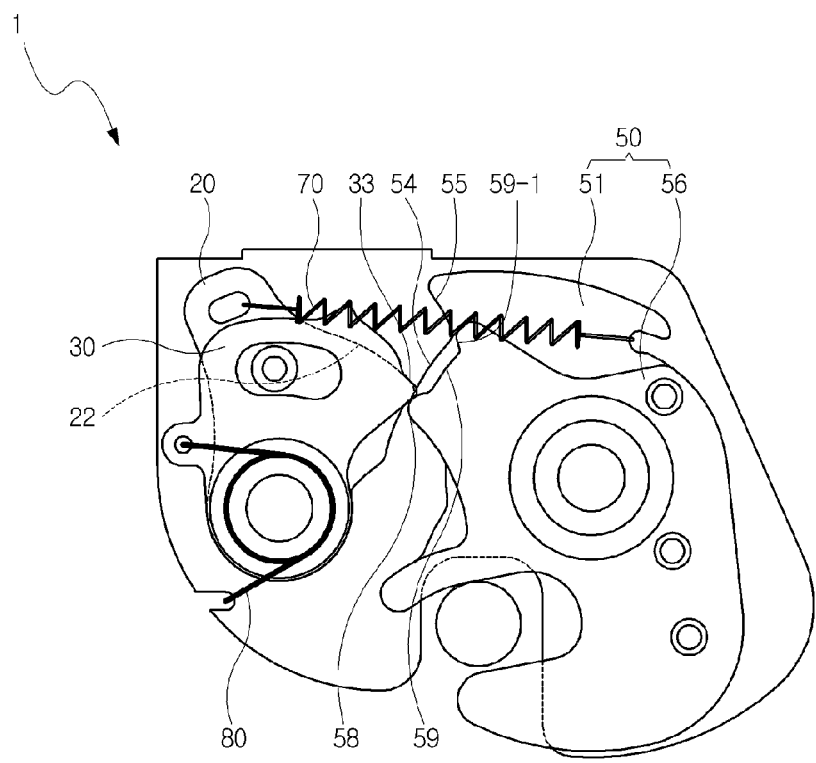
FIG. 9 is a front view illustrating a locking process of the locking withdrawn latch assembly for the vehicle seat in FIG. 8.

Then, the pawl 20 and the pawl plate 30 are respectively separated from the lower blocking surface 55 and the upper blocking surface 59-1 to move along the two round surfaces 54 and 59 with the respective rotation positions thereof being stationary so that the end part of the first supporting surface 33 of the pawl plate 30 can contact to the pressing end part 58 of the upper latch 56 as shown in FIG. 9.

Then, while the end part of the first supporting surface 33 passes by the pressing end part 58, the pawl plate 30 rotates in the counterclockwise direction to some extent, and to the contrary, the pawl 20 maintains a stationary rotation position since the pawl 20 still contacts to the round surface 54 of the lower latch 51.

After the end part of the first supporting surface 33 passes by the pressing end part 58, the pawl plate 30 rapidly rotates in the clockwise direction by means of the restitution force of the torsion spring 80.

At the same time, when the end part of the second supporting surface 22 passes by the round surface 54, the pawl 20 rapidly rotates in the clockwise direction by means of the contraction force of the tension spring 70.

When the rotation of the pawl 20 and the pawl plate 30 is completed, the pawl 20 and the pawl plate 30 have the same state as shown in FIG. 2.

That is, the pressing surface 32 of the pawl plate 30 contacts to and presses the upper locking surface 57 of the upper latch 56, and the end part of the second supporting surface 22 contacts to the round surface 53 of the lower latch 51 so that the pawl 20 can contact and be supported thereto.

As described above, when the latch assembly 1 is converted from the open state into the locking state, the pressing end part 58 of the upper latch 56 presses the end part of the first supporting surface 33 so that the pawl plate 30 can further rotate in the counterclockwise direction to supply an increased restitution force to the torsion spring 80, thereby enabling the pressing surface 32 to further certainly contact to and support the locking surface 57 in the locking state.

As shown in FIG. 2, in the locking state of the latch assembly 1, the locking position of the latch 50 is that the latch groove part 56a contacts to the locking pin 2 as described above. This locking position may vary depending on the thickness of the locking pin 2 or a right and left position of the locking pin 2 inside the depressed Groove part 10a.

That is, the locking position of the latch 50 may have some variation in the rotation angle thereof.

Also, this variation may be caused due to an allowable manufacturing error range of a product, etc.

The latch assembly 1 for the vehicle seat according to the exemplary embodiment of the present invention is capable of smoothly accommodating and coupling the locking pin 2 although the pocking position of the latch 50 is changed to some extent.

Figure 10:
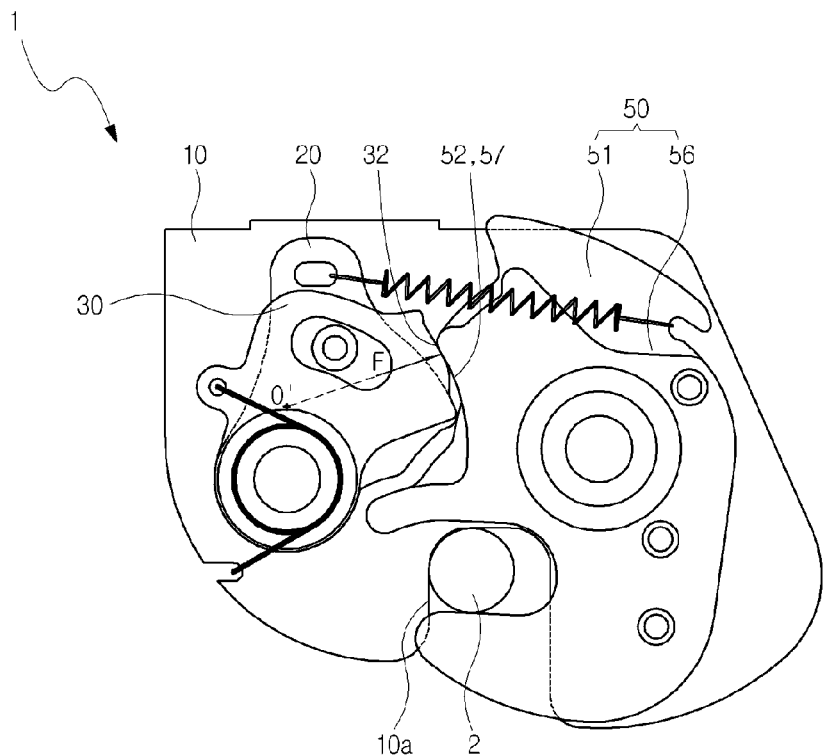
FIGS. 10 and 11 are front views respectively illustrating locking states of the latch assembly for the vehicle seat in FIG. 1 under changed locking conditions.
Figure 11:
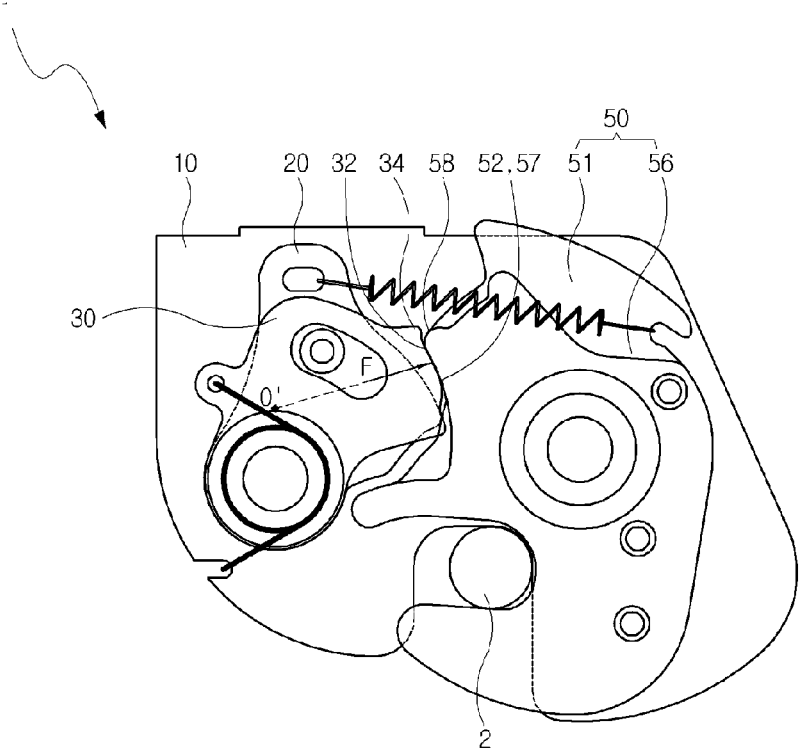

FIGS. 10 and 11 illustrate locking states in which the locking pin 2 is accommodated to the depressed groove part 10a to be biased left (referring to FIG. 10) and right (referring to FIG. 11).

At first, the depressed groove unit 10a has such a sufficient width as to accommodate the locking pin 2 with a consideration that the accommodated position of the locking pin 2 may vary right and left to some extent.

As shown in FIGS. 10 and 11, if the locking pin 2 is biased left or right, the locking position of the latch 50 may be a position further rotated in the clockwise direction or the counterclockwise direction to some extent than a reference position in FIG. 2.

However, in this case, the pressing surface 32 of the pawl plate 30 maintains contacting to and supporting the locking surface 57 of the upper latch 56.

Merely, the contact point between the pressing surface 32 and the locking surface 57 is changed along the locking surface 57 and the pressing surface 32 in comparison with the case in FIG. 2.

Accordingly, the rotation position of the pawl plate 30 is also changed as shown in FIGS. 10 and 11.

Alternatively, the locking position of the latch 50 may be changed according that the thickness of the locking pin 2 varies within an allowable error range, and this may correspond to the case that the position of the locking pin 2 varies right and left (referring to FIGS. 10 and 11).

As shown in FIG. 11, the pawl plate 30 further includes an engagement end part 34 protruding from a side of the pressing surface 32 in a radius direction.

The engagement end part 34 prevents the pawl plate 30 from additionally rotating when the pawl plate 30 rotates to the locking position so that the locking surface 57 can be contacted and supported by means of the pressing surface 32 in spite of size error, position error, etc. of the locking pin 2.

That is, if the pawl plate 30 additionally rotates with the pressing surface 32 contacting to the locking surface 57, the engagement end part 34 is engaged to the pressing end part 58 of the upper latch 56, thereby preventing the pawl plate 30 from additionally rotating.

When the latch assembly 1 for the vehicle seat is in the locking state in FIG. 2, if an impact is applied to the chassis, this impact is transmitted to the rotation of the latch 50 through the locking pin 2 and the latch groove part 56a, the locking surfaces 52 and 57 and the pressing surface 32 of the pawl plate 30.

This impact may be caused due to an impact applied to a wheel by means of an unpaved road, etc. while the vehicle travels.

Figure 12:
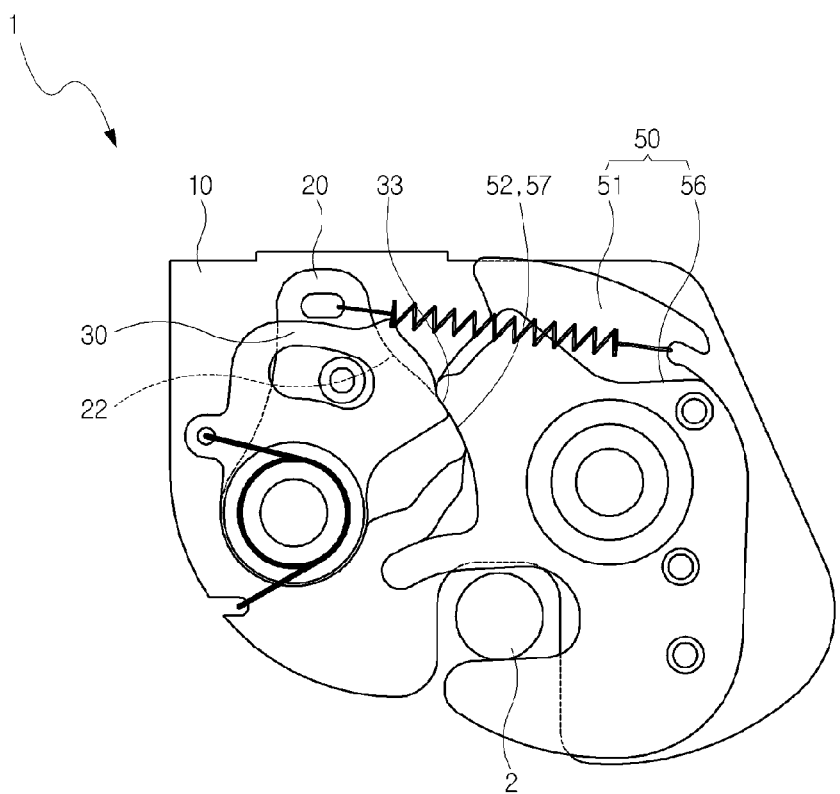
FIG. 12 is a front view illustrating a state in which an impact is applied to the latch assembly for the vehicle seat in the locking state in FIG. 2.

In case of a small impact, the pressing surface 32 of the pawl plate 30 has a predetermined pressing angle α against the upper locking surface 57 to absorb an applied supporting force F. However, if a big impact exceeding the supporting force F is generated, the pawl plate 30 rotates in the counterclockwise direction to some extent by means of the impact transmission of the upper locking surface 57 so that the first supporting surface 33 of a right side of the pressing surface 32 can contact to and support the upper locking surface 57 as shown in FIG. 12.

Also, at the same time, the second supporting surface 22 of the pawl 20 contacts to and supports the lower locking surface 52.

That is, the latch 50 rotates in the counterclockwise direction together with the pawl plate 30 to some extent, and concurrently, the rotating latch 50 is simultaneously supported by means of the pawl 20 and the pawl plate 30 so that the impact generated to the vehicle can be absorbed.

Accordingly, the impact to the vehicle is capable of being prevented from being intactly transmitted to a person on the seat, and being partially absorbed to the latch assembly 1 to be reduced and transmitted, and the latch 50 is capable of preventing the locking state of the seat by means of the locking pin 2 from being released since the latch 50 is doubly supported by means of the pawl 2 and the pawl plate 30.

The invention claimed is:

1. A latch assembly for a vehicle seat which comprises a base plate, a latch which is rotatably coupled to the base plate to rotate between a locking position and an open position, and a pawl and a pawl plate which are coaxial with the base plate and coupled to be overlapped each other to interact with each other to rotate, the latch assembly for the vehicle seat comprising:

the latch comprising a locking surface;

the pawl plate comprising a pressing surface which presses the locking surface when the latch is positioned at the locking position, and a first supporting surface which supports the locking surface when the latch rotates by means of an impact; and the pawl comprising a second supporting surface which supports the locking surface together with the pawl plate when the latch rotates by means of the impact, wherein the latch comprises a lower latch which interacts with the pawl, and an upper latch which is integrally overlapped over the lower latch to interact with the pawl plate, the locking surface comprises a lower locking surface which is formed to the lower latch, and an upper locking surface which is formed to the upper latch, and the first supporting surface supports the upper locking surface, and the second supporting surface supports the lower locking surface when the latch rotates by means of the impact.

2. The latch assembly for the vehicle seat according to claim 1, wherein the pressing surface forms a part of a circular arc which comprises a rotation center which is distanced from a rotation shaft of the pawl plate to contact to the locking surface to form a predetermined pressing angle when the latch is positioned at the locking position, and the first supporting surface extends from a first side of the pressing surface, and forms a part of a circular arc, the center of which is the rotation shaft of the pawl plate.

3. The latch assembly for the vehicle seat according to claim 2, wherein the pawl plate further comprises an engagement end part which protrudes from a secondside of the pressing surface in a radius direction to prevent the pawl plate from additionally rotating when the latch is positioned at the locking position.

4. The latch assembly for the vehicle seat according to claim 1, wherein the lower locking surface and the upper locking surface are formed to correspond to each other.

5. The latch assembly for the vehicle seat according to claim 4, wherein the upper latch is formed with an accommodating space part which accommodates an end part of the second supporting surface of the pawl plate when the latch is positioned at the locking position.

6. The latch assembly for the vehicle seat according to claim 1, wherein the upper latch is formed with an accommodating space part which accommodates an end part of the second supporting surface of the pawl plate when the latch is positioned at the locking position.

7. The latch assembly for the vehicle seat according to claim 1, wherein the latch comprises a blocking surface, and the first supporting surface and the second supporting surface support the blocking surface when the latch is positioned at the open position.

8. The latch assembly for the vehicle seat according to claim 7, wherein the latch comprises a lower latch which interacts with the pawl, and an upper latch which is integrally overlapped over the lower latch to interact with the pawl plate, the blocking surface comprises a lower blocking surface which is formed to the lower latch, and an upper blocking surface which is formed to the upper latch, and the first supporting surface supports the upper blocking surface, and the second supporting surface supports the lower blocking surface when the latch is positioned at the open position.

9. The latch assembly for the vehicle seat according to claim 8, wherein the latch is formed with a pressing end part which presses an end part of the first supporting surface to rotate the pawl plate by a predetermined angle while rotating from the open position to the locking position.

10. The latch assembly for the vehicle seat according to claim 1, wherein the pawl plate is restricted by means of the pawl to have a restricted rotation range.

11. The latch assembly for the vehicle seat according to claim 10, wherein the pawl comprises a guide protrusion which is distanced from a rotation shaft thereof to protrude, and the pawl plate comprises a slide groove which accommodates the guide protrusion, and guides the guide protrusion to rotate in a circumferential direction by a predetermined interval.

12. The latch assembly for the vehicle seat according to claim 11, wherein the pawl and the pawl plate are elastically pressed to respectively and independently rotate toward the latch.

13. The latch assembly for the vehicle seat according to claim 10, wherein the pawl and the pawl plate are elastically pressed to respectively and independently rotate toward the latch.

14. The latch assembly for the vehicle seat according to claim 1, wherein the pawl and the pawl plate are elastically pressed to respectively and independently rotate toward the latch.

15. The latch assembly for the vehicle seat according to claim 1, wherein the base plate comprises a depressed groove part which has a wide width, and accommodates a locking pin which is coupled to a chassis, the latch comprises a latch groove part which accommodates the locking pin together with the depressed groove part, and the locking position of the latch varies depending on the thickness of the locking pin or a position in which the locking pin is accommodated inside the depressed groove part.

16. A latch assembly for a vehicle seat which comprises a base plate, a latch which is rotatably coupled to the base plate to rotate between a locking position and an open position, and a pawl and a pawl plate which are coaxial with the base plate and coupled to be overlapped each other to interact with each other to rotate, wherein the latch comprises a lower latch which interacts with the pawl, and an upper latch which is integrally overlapped over the lower latch to interact with the pawl plate and is formed with an upper locking surface, the pawl plate comprises a pressing surface which presses the upper locking surface when the latch is positioned at the locking position.

17. The latch assembly for the vehicle seat according to claim 16, wherein the lower latch a lower locking surface which is supported by the pawl when the latch rotates by means of an impact.

18. The latch assembly for the vehicle seat according to claim 17, wherein the pawl plate comprises a first supporting surface which supports the upper locking surface when the latch rotates by means of the impact, the pawl comprises a second supporting surface which supports the lower locking surface when the latch rotates by means of the impact.

19. The latch assembly for the vehicle seat according to claim 18, wherein the upper latch is formed with an accommodating space part which accommodates an end part of the second supporting surface of the pawl plate when the latch is positioned at the locking position.

* * * * *